(12) United States Patent
Winograd et al.

(10) Patent No.: US 11,468,149 B2
(45) Date of Patent: Oct. 11, 2022

(54) DEVICE AUTHENTICATION IN COLLABORATIVE CONTENT SCREENING

(71) Applicant: Verance Corporation, San Diego, CA (US)

(72) Inventors: Joseph M. Winograd, San Diego, CA (US); Jian Zhao, San Diego, CA (US); Michael George Kiefer, San Diego, CA (US)

(73) Assignee: Verance Corporation, San Diego, CA (US)

(*) Notice: Subject to any disclaimer, the term of this patent is extended or adjusted under 35 U.S.C. 154(b) by 424 days.

(21) Appl. No.: 16/387,519

(22) Filed: Apr. 17, 2019

(65) Prior Publication Data

US 2019/0318061 A1 Oct. 17, 2019

Related U.S. Application Data

(60) Provisional application No. 62/659,091, filed on Apr. 17, 2018.

(51) Int. Cl.
 *G06F 21/44* (2013.01)
 *G06F 21/10* (2013.01)
 *H04L 9/32* (2006.01)

(52) U.S. Cl.
 CPC .............. *G06F 21/10* (2013.01); *G06F 21/44* (2013.01); *G06F 2221/0733* (2013.01);
 (Continued)

(58) Field of Classification Search
 CPC .. G06F 21/10; G06F 21/44; G06F 2221/0733; G06F 2221/0746
 See application file for complete search history.

(56) References Cited

U.S. PATENT DOCUMENTS 6,122,610 A 9/2000 Isabelle
6,145,081 A 11/2000 Winograd et al.
(Continued)

FOREIGN PATENT DOCUMENTS

JP 2004163855 6/2004
JP 2004173237 6/2004
(Continued)

OTHER PUBLICATIONS

Aris Technologies, Inc. "Audio Watermarking System to Screen Digital Audio Content for LCM Acceptance," May 1999 (17 pages).
(Continued)

*Primary Examiner* — David J Pearson
(74) *Attorney, Agent, or Firm* — Donald L. Wenskay

(57) ABSTRACT

Content screening operations, which can include watermark extraction and the application of content usage enforcement actions, may be organized such that some or all of the operations can be conducted by different devices that are connected via connectors such as HDMI (High-Definition Multimedia Interface (HDMI), analog composite video, DVI (Digital Visual Interface), SDI (Serial Digital Interface), DisplayPort, or networked via Ethernet or wireless. Authentication and encryption methods are disclosed that can be used to establish the trust and secure communication between devices that conduct collaborative content screening. Delegation architecture may be based on ascertained screening capabilities of the sink device wherein the source device verifies that the sink device is capable and trusted to perform partial or whole screening operations delegated by the source. Alternatively, delegation architecture may be based on ascertained screening capabilities of the source device wherein the sink device verifies that the source device is capable and trusted to provide correct content credential and content use policy ("content credential") that
(Continued)

is needed for the sink device to determine whether content screening should be performed, and if yes, what content screening operations should be performed.

6 Claims, 3 Drawing Sheets

(52) U.S. Cl.
CPC .... *G06F 2221/0746* (2013.01); *H04L 9/3247* (2013.01); *H04L 2209/601* (2013.01); *H04L 2209/603* (2013.01)

(56) References Cited

U.S. PATENT DOCUMENTS

| | | |
|---|---|---|
| 6,175,627 B1 | 1/2001 | Petrovic et al. |
| 6,427,012 B1 | 7/2002 | Petrovic |
| 6,430,301 B1 | 8/2002 | Petrovic |
| 6,683,958 B2 | 1/2004 | Petrovic |
| 6,792,542 B1 | 9/2004 | Lee et al. |
| 6,888,943 B1 | 5/2005 | Lam et al. |
| 6,931,536 B2 | 8/2005 | Hollar |
| 7,024,018 B2 | 4/2006 | Petrovic |
| 7,159,118 B2 | 1/2007 | Petrovic |
| 7,224,819 B2 | 5/2007 | Levy et al. |
| 7,460,667 B2 | 12/2008 | Lee et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,085,935 B2 | 12/2011 | Petrovic |
| 8,138,930 B1 | 3/2012 | Heath |
| 8,151,113 B2 | 4/2012 | Rhoads |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,280,103 B2 | 10/2012 | Petrovic et al. |
| 8,301,893 B2 | 10/2012 | Brundage |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,467,717 B2 | 6/2013 | Croy et al. |
| 8,479,225 B2 | 7/2013 | Covell et al. |
| 8,533,481 B2 | 9/2013 | Petrovic et al. |
| 8,538,066 B2 | 9/2013 | Petrovic et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic |
| 8,682,026 B2 | 3/2014 | Petrovic et al. |
| 8,726,304 B2 | 5/2014 | Petrovic et al. |
| 8,745,403 B2 | 6/2014 | Petrovic |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,826,346 B1 | 9/2014 | Panje et al. |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,923,548 B2 | 12/2014 | Petrovic et al. |
| 9,009,482 B2 | 4/2015 | Winograd |
| 9,055,239 B2 | 6/2015 | Tehranchi et al. |
| 9,106,964 B2 | 8/2015 | Zhao |
| 9,117,270 B2 | 8/2015 | Wong et al. |
| 2002/0162118 A1 | 10/2002 | Levy et al. |
| 2006/0239503 A1 | 10/2006 | Petrovic et al. |
| 2007/0039018 A1 | 2/2007 | Saslow et al. |
| 2011/0261667 A1 | 10/2011 | Ren et al. |
| 2011/0293090 A1 | 12/2011 | Ayaki et al. |
| 2011/0320627 A1 | 12/2011 | Landow et al. |
| 2012/0023595 A1 | 1/2012 | Speare et al. |
| 2012/0054194 A1 | 3/2012 | Gao et al. |
| 2012/0072731 A1* | 3/2012 | Winograd ............... G09C 5/00 713/176 |
| 2012/0102304 A1 | 4/2012 | Brave |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0129303 A1 | 5/2013 | Lee et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0325622 A1 | 12/2013 | Kamitani et al. |
| 2014/0067950 A1 | 3/2014 | Winograd |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0267907 A1 | 9/2014 | Downes et al. |
| 2014/0270337 A1 | 9/2014 | Zhao et al. |
| 2014/0279549 A1 | 9/2014 | Petrovic et al. |
| 2014/0289873 A1 | 9/2014 | Morss et al. |
| 2014/0325550 A1 | 10/2014 | Winograd et al. |
| 2014/0325673 A1 | 10/2014 | Petrovic |
| 2015/0030200 A1 | 1/2015 | Petrovic et al. |
| 2015/0121534 A1 | 4/2015 | Zhao et al. |
| 2015/0264429 A1 | 9/2015 | Winograd et al. |
| 2016/0112771 A1 | 4/2016 | Choi et al. |
| 2016/0162858 A1* | 6/2016 | Winograd ......... G06Q 20/1235 705/51 |
| 2016/0301987 A1 | 10/2016 | Eyer |
| 2020/0028698 A1* | 1/2020 | Hunacek ............ H04N 21/4302 |

FOREIGN PATENT DOCUMENTS

| | | |
|---|---|---|
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 1020120128149 | 11/2012 |
| WO | 2005017827 | 2/2005 |
| WO | 2005038778 | 4/2005 |
| WO | 2006051043 | 5/2006 |
| WO | 2009031082 | 3/2009 |
| WO | 2010073236 | 7/2010 |
| WO | 2010135687 | 11/2010 |
| WO | 2011116309 | 9/2011 |
| WO | 2013163921 | 11/2013 |
| WO | 2014153199 | 9/2014 |

OTHER PUBLICATIONS

Bangaleea, R., et al., "Performance improvement of spread spectrum spatial-domain watermarking scheme through diversity and attack characterisation," IEEE Africon, pp. 293-298, 2002.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

(56) References Cited

OTHER PUBLICATIONS

Kalker, T., et al., "System issues in digital image and video watermarking for copy protection," Proc. IEEE Int. Conf. on Multimedia Computing and Systems, pp. 562-567, Jun. 1999.
Kirovski, D., et al., "Multimedia content screening using a dual watermarking and fingerprinting system," Proceedings of the tenth ACM international conference, pp. 372-381, 2002.
Kirovski, D., et al., "Multimedia content screening using a dual watermarking and fingerprinting system," Multimedia '02 Proceedings of the tenth ACM international conference on Multimedia, 2002 (11 pages).
Verance Corporation, "Confirmedia," PowerPoint presentation made to National Association of Broadcasters, Apr. 24, 2001 (40 pages).
Zhao, J., "A WWW service to embed and prove digital copyright watermarks," Proc. European Conf. on Multimedia Applications, Services and Techniques (ECMAST'96), May 1996 (15 pages).
Zhao, J., "Applying digital watermarking techniques to online multimedia commerce," Proc. Int. Conf. on Imaging Science, Systems and Applications (CISSA'97), Jun./Jul. 1997 (7 pages).
"ATSC-3.0 Automatic Content Recognition Watermarking Solutions," ATSC Technology Group, Advanced Television Systems Committee, Inc., Jan. 2014 (6 pages).
"ATSC Candidate Standard: Service Usage Reporting," ATSC Technology Group, Advanced Television Systems Committee, Inc., Dec. 2015 (15 pages).
"ATSC Candidate Standard: Content Recovery in Redistribution Scenarios," ATSC Technology Group, Advanced Television Systems Committee, Inc., Dec. 2015 (43 pages).
International Search Report and Written Opinion for PCT/US2017/028198, dated Aug. 8, 2017 (13 pages).

* cited by examiner

DEVICE AUTHENTICATION IN COLLABORATIVE CONTENT SCREENING

FIELD OF INVENTION

The present invention generally relates to the field of media content protection. More particularly, the disclosed embodiments relate to device authentication when content is screened in a collaborative manner among multiple media devices.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Content screening operations, including watermark extraction and the application of content usage enforcement actions, may be organized such that some or all of the operations can be conducted by different connected devices.

SUMMARY OF THE INVENTION

Figure 1:
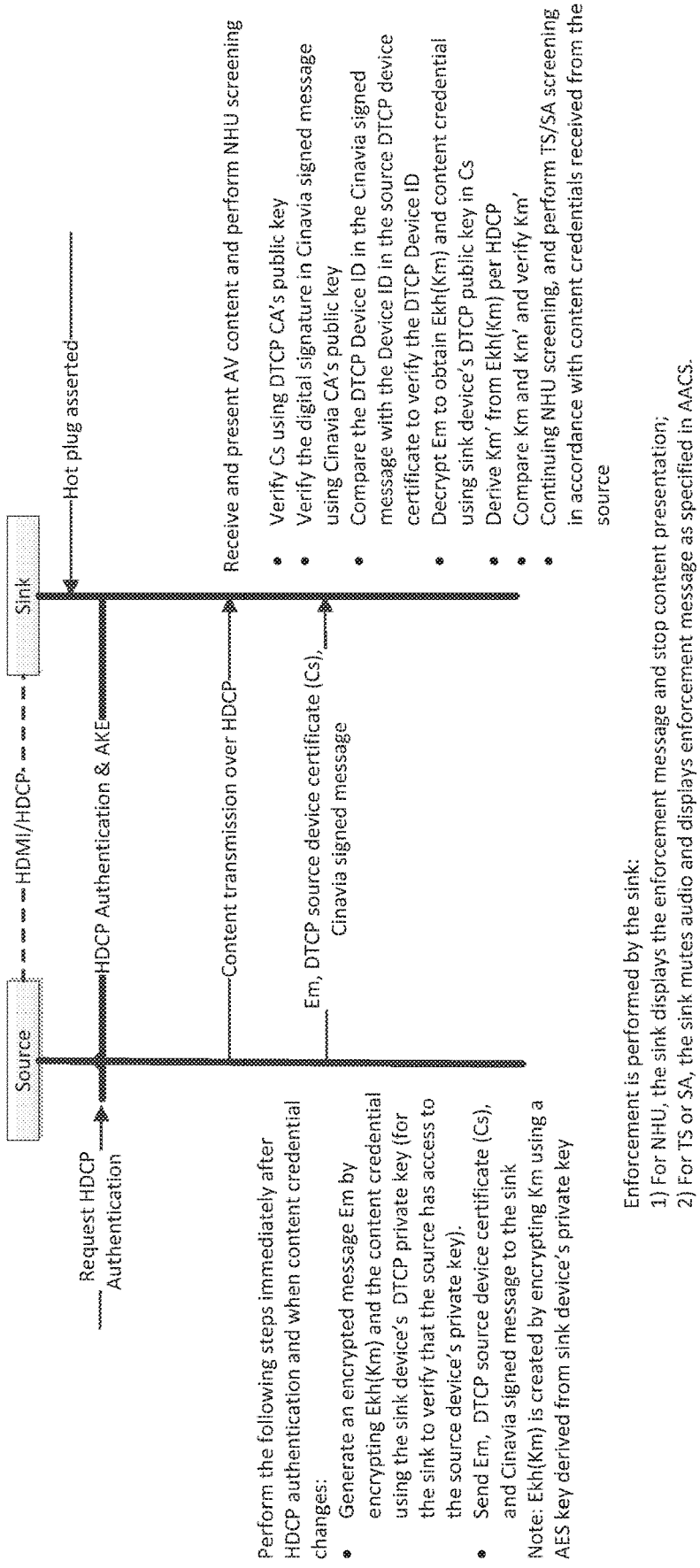
FIG. 1 illustrates a diagram of source authentication with DTCP based on a Cinavia signed message in accordance with various disclosed embodiments.

This section is intended to provide a summary of certain exemplary embodiments and is not intended to limit the scope of the embodiments that are disclosed in this application.

One aspect of the disclosed embodiments relates to a method for device authentication in collaborative content screening. The method includes providing source and sink devices for receiving content. The sink device verifies that the source device is capable and trusted to provide correct content credential and content use policy needed for the sink device to determine whether content screening should be performed and what content screening operation should be performed.

These and other advantages and features of disclosed embodiments, together with the organization and manner of operation thereof, will become apparent from the following detailed description when taken in conjunction with the accompanying drawings.

DETAILED DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Content screening operations, which can include watermark extraction and the application of content usage enforcement actions, may be organized such that some or all of the operations can be conducted by different devices that are connected via connectors such as High-Definition Multimedia Interface (HDMI), analog composite video, DVI (Digital Visual Interface), SDI (Serial Digital Interface), DisplayPort, or networked via Ethernet or wireless. Such collaborative content screening performed by more than one device is extensively disclosed in U.S. Pat. Nos. 8,838,977 and 9,607,131, the contents of which are hereby incorporated by reference.

This disclosure describes the authentication and encryption methods under the following architecture that can be used to establish the trust and secure communication between devices that conduct collaborative content screening.

Delegation architecture based on ascertained screening capabilities of the sink device ("sink authentication architecture"): the source device verifies that the sink device is capable and trusted to perform partial or whole screening operations delegated by the source.

Delegation architecture based on ascertained screening capabilities of the source device ("source authentication architecture"): the sink device verifies that the source device is capable and trusted to provide correct content credential and content use policy ("content credential") that is needed for the sink device to determine whether content screening should be performed, and if yes, what content screening operations should be performed.

A source device (e.g., a set-top box, OTT box) receives content from a content source and outputs the content to a sink device. A sink device such as a TV set receives the content from the source device and may present (or copy or move) the received content. A device can be a source device and a sink device if it receives content from a sink device and also outputs the content to a sink device.

Content credential and use policy ("content credential") may contain the following information:

Content source type. The content source type of the content describes the source from which the content is delivered to the source device. Examples of the content source type include: ATSC (1.0 or 3.0) tuner, a URL or domain name of the content streaming service (e.g., Netflix.com or hulu.com), a Blu-ray player, cable or satellite service (e.g., Comcast, AT&T);

An indication that the content on the source device is protected by a content protection system that is "Source Authentication Compliant Technologies" (SACT). A content protection system is a DRM (Digital Right Management) system, CA (Conditional Access) system, a link protection system (HDCP or DTCP), or any other content encryption system;

Identifier, security level, or version number of the content protection system used to protect the content received at the source device DRM Security levels are described in more detail below;

Pre-existing watermark extraction records as described in U.S. Pat. Nos. 8,745,403, 9,298,891. The extraction records allow the sink device to perform content screening without watermark extraction.

Content metadata such as content ID such as EIDR (The Entertainment Identifier Registry Association, www.eidr.org/) or AD-ID (http://www.ad-id.org/), video resolution and quality, HDR (high dynamic range) feature, 3D audio and other audio and video characteristics.

The sink device may determine screening obligation based on one or combined information described above in the content credential. The content credential is securely sent to the sink device once source authentication process is completed. When certain information of the content credential such as content source type or content protection system changes, the source device is required to securely send the content credential again or an update.

DRM Security Levels

Each DRM (playready, widevine, and fairplay) have security levels for their devices that describe what level of security they support. Content owners can then license content instances for devices of a particular security level. A DRM may need to create a new security level for Cinavia for TV. So, this way we have the content provider that watermarks the content and DRM protects the content. Then the license server can know that it will only license Cinavia watermarked content to devices that have the Cinavia security level. This means the playback device supports Cinavia for TV and can then provide a Cinavia enabled TV with the proper credentials to be an authenticated source, in other words the device is capable of passing the Cinavia Source Authentication. If a DRM license server licensed content to a playback device that did not support Cinavia for TV and the content is Cinavia watermarked, then a Cinavia enabled TV would disallow playback and enforce stopping playback when the playback device(source) failed the Cinavia Source Authentication. This would be a bad experience for users because they would get a lot of enforcements. f the license server knew that the playback device was not of the Cinavia security level, then depending on the choices the content provider chooses to make, they could deliver a version of the content (or content instance) that was of a lower quality that did not require Cinavia for TV Source Authentication.

Widevine defines their security levels like this:

Security Level 1: All content processing, cryptography, and control is performed within the Trusted Execution Environment (TEE). In some implementation models, security processing may be performed in different chips.

Security Level 2: Performs cryptography (but not video processing) within the TEE: decrypted buffers are returned to the application domain and processed through separate video hardware or software. At level 2, however, cryptographic information is still processed only within the trusted execution environment.

Security Level 3: Does not have a TEE on the device. Appropriate measures may be taken to protect the cryptographic information and decrypted content on host operating system. A Level 3 implementation may also include a hardware cryptographic engine, but that only enhances performance, not security.

In many cases, such as Movielabs requirements, content owners require their highest value content (highest quality, first run, etc.) to only be licensed to Security Level 1 devices those devices must only output to a sync over HDCP 2.2 (latest version). So, this is an area that we can attach the Cinavia security level to. We may apply it to ATSC3 in a similar way that security levels are applied to Movielabs.

Source Authentication Architecture

A source authentication architecture is described in this section.

Challenges

Free-to-air TV content is transmitted unencrypted. These signals (and unencrypted "fair use" recordings made for time shifting purposes) cannot be differentiated from unencrypted pirate signals. Watermark enforcement on fair use recordings of free-to-air broadcast content must be avoided.

Pay television signals are output from STBs using DTCP and HDCP link encryption. DTCP and HDCP do not include any limitations on activation of link encryption for pirated content. Link encrypted pay television signals cannot be differentiated from link encrypted pirate signals. The use of link encryption as a laundry channel for pirate signals must be addressed.

Solution Architecture

Establish Source Authentication (SA) protocol that enables sink to securely determine content protection status of content received from a source over a link protected interface.

Define a reserved bit in the Cinavia Copy Management (CM) Payload to be the "Source Authentication" (SA) bit, meaning that source authentication is required for playback over link protection. Legacy TS content shall be TS/NoSA. See Appendix A for further details about Cinavia technology.

Establish a list of content protection systems as "Source Authentication Compliant Technologies" (SACT).

Criteria for SACT eligibility:
  Shall be a TSMAT
  Shall require Source Authentication protocol on all link protection inputs and outputs.

Broadcasters embed TS/SA in SACT distribution, TS/NoSA in TSMAT distribution, NIR or unwatermarked otherwise.

HDCP and DTCP without SA shall be TSMAT but not SACT.

Broadcasters adopt a SACT content protection system for ATSC 3.0 encrypted broadcasts with the following Cinavia compliance rules for SACT clients such as TV/Media Receivers: (STB/DMA)
  Screen content from HDMI sources with HDCP source authentication
  Screen content from USB sources with DRM source authentication
  Screen content from application sources with DRM source authentication
  Screen content from Miracast/other casting sources with DTCP source authentication
  Screen content from DLNA/other home network sources with DTCP source authentication
  Employ source authentication on any link protected outputs Solution Description ATSC 1.0 broadcasts must remain unwatermarked and will never receive watermark protection. The quality of these broadcasts will be progressively downgraded as the ATSC 3.0 transition progresses, reducing their attractiveness to pirates and differentiating them from protected content, and will ultimately be cut off, removing the threat.

Broadcasters can encrypt ATSC 3.0 services with SACT protection and embed them with TS/SA watermark state. Broadcasters can establish compliance rules that include a screening obligation for client devices that include decryption capabilities. These devices will block playback of pirated ATSC 3 content from all inputs and can refer blocked pirates to legitimate sources.

MVPD/vMVPD services may be watermarked with TS/NoSA if they are using TSMAT protection or TS/SA if they are using SACT protection. TS/NoSA content will be subject to a laundry channel attack, since a legitimate source (e.g. BD Player) and pirate source (e.g. Kodi box) cannot be distinguished by a sink device via link protection. Broadcasters can tier the quality of the content provided to these services in the same way they do with ATSC 3 & ATSC 1. MVPD/vMVPD service providers should be motivated to offer high quality content and address piracy which undermines their business.

Pressure from MVPD/vMVPD service providers and broadcasters will be necessary to cause the platforms (DRM, OS) to transition from TSMAT to SACT protection.

Several authentication and secure communication methods for source authentication architecture are described below.

Cinavia Signed Message for Source Authentication

This source authentication method takes advantage of DTCP (see http:://www.dtcp.com) device certificate that are widely available on the source devices such as set-top box and gateway device. It requires that the source device has a DTCP device certificate.

A Cinavia signed message is created with information associated with a DTCP device certificate. A Cinavia signed message consists of at least the data to be signed and a digital signature of the data signed by Cinavia Certificate Authority ("Cinavia CA") using a digital algorithm such as RSA or EC-DSA. Cinavia signed message can be compliant with IETF RFC 5652 "Cryptographic Message Syntax" (CMS) (https://tools.ietf.org/html/rfc5652).

The data to be signed include at least the Device ID in the DTCP device certificate and may also include the following fields:

Version number of the Cinavia signed message, which may indicate the different versions of capability and trustworthy level of the device associated with the signed message;

Cinavia Specification identification and version number, which indicates version of the Cinavia specifications with which the device is compliant;

Version number of System Renewability Message (SRM) signed by Cinavia CA (or its designated CA) and used by the sink device for revocation of Cinavia signed message associated with the DTCP device certificate;

Number of SRM generations required to store in the device;

Unique Device ID assigned by Cinavia CA; this unique Device ID may help uniquely identify a device for the purposes such as device certificate revocation if the device uses a Common DTCP Device Certificate in which the DTCP Device ID is not unique.

Any other fields in the DTCP device certificate such as the public key, issued by DLTA or its designated entity.

Source and Sink Devices Connected Via HDMI

If the source and sink devices are connected via HDMI or other connectors such as DVI or DisplayPort, HDCP is likely used for link protection, the source authentication takes place immediately after HDCP authentication and key exchange process.

As shown in FIG. 1, once HDCP authentication and key exchange is completed or when certain information in content credential changes, the source device generate an encrypted message by encrypting a shared secret between two devices such as Ekh(Km) and the content credential using the sink device's DTCP private key and send the encrypted message together with the source device's DTCP device certificate and the Cinavia signed message to the sink device. Note that Ekh(Km) is created during the HDCP authentication by encrypting the session key Km using a AES key derived from sink device's private key. See http://www.dtcp.com for further information regarding DTCP.

Optionally, the Cinavia signed message can be encrypted using sink device's DTCP private key before it is sent to the sink device.

Once the sink device receives the encrypted content credential and Cinavia signed message, it performs the following steps:

Verify the source device's DTCP device certificate using DTCP CA's public key;

Verify the digital signature in the Cinavia signed message using Cinavia CA's public key;

Compare the DTCP Device ID in the Cinavia signed message with the Device ID in the source DTCP device certificate to verify the DTCP Device ID;

Decrypt encrypted to obtain the shared secret, i.e., Ekh (Km) and content credential using sink device's DTCP public key in Cs; and Verifying the shared secret to prove that the source device has access to the correct shared secret. In the case where Ekh(Km) is used as the shared secret, the sink device derives Km' from Ekh(Km) per HDCP and then compare Km with Km' to confirm that they are identical.

For legacy source device with Common DTCP Device Certificate to be Source Authentication (SA) compliant, it must be updated with a DTCP Device Certificate with a unique Device ID and an associated Cinavia signed message.

Networked Source and Sink Devices

If the source and sink devices are connected via network (e.g., Ethernet or wireless), DTCP is likely used for link protection, the source authentication takes place immediately after DTCP authentication and key exchange process.

Figure 2:
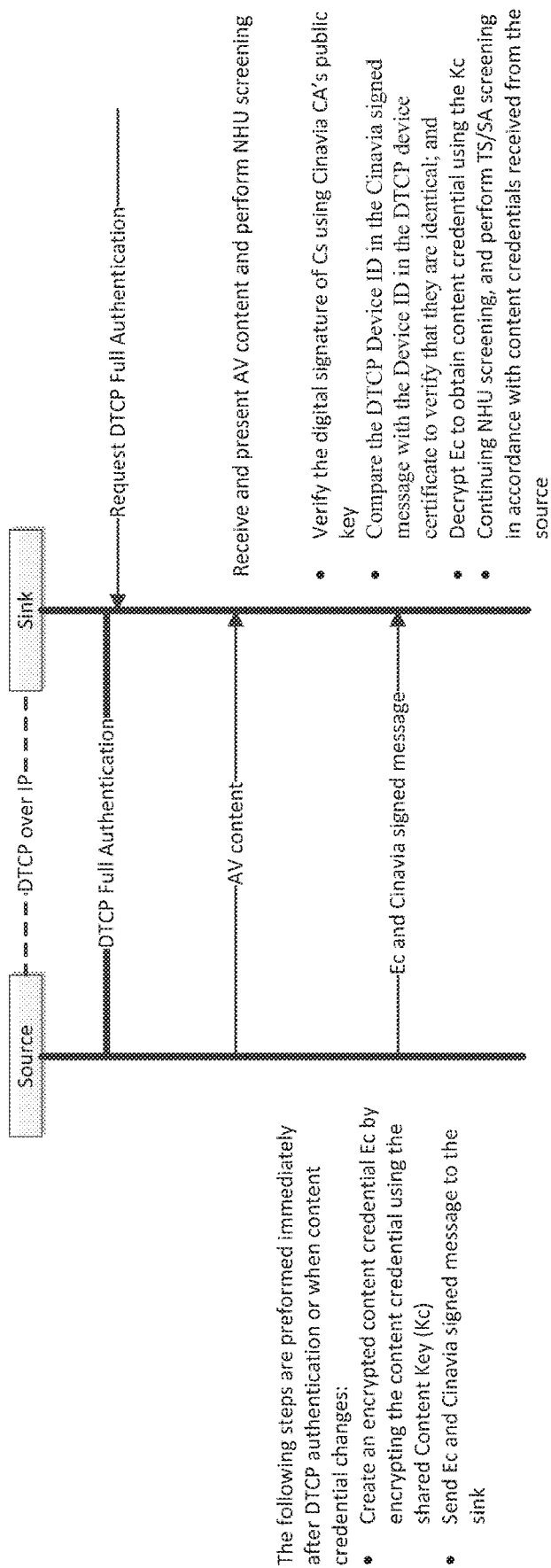
FIG. 2 illustrates a diagram of source authentication with HDCP based on a Cinavia signed message in accordance with various disclosed embodiments.

As shown in FIG. 2, once the full DTCP authentication and key exchange is completed or when certain information in content credential changes, The source device creates an encrypted content credential determined by the source device by encrypting content credential using the current Content Key (Kc) shared in the full DTCP authentication process between the source and sink devices, and Send the encrypted content credential together with the Cinavia signed message of the source device to the sink device.

Once the sink device receives the encrypted content credential and Cinavia signed message, it Verifies the digital signature in the Cinavia signed message using Cinavia CA's public key;

Compares the DTCP Device ID in the Cinavia signed message with the Device ID in the DTCP device certificate to verify that they are identical; and Decrypts the encrypted content credential to obtain content credential using the current Content Key (Kc).

Optionally, the Cinavia signed message can be encrypted using current Content Key (Kc) before it is sent to the sink device.

It is assumed that the source device certificate is available to the sink device after the full DTCP authentication. Optionally, the source device can send its DTCP certificate together with encrypted content credential and Cinavia signed message to the sink device for source authentication.

Screening Operations

As shown in FIGS. 1 and 2, once the HDCP authentication or the full DTCP authentication is completed, the source device starts to send encrypted content to the sink device. Once the sink device receives the encrypted content, it decrypts it for presentation (or for other uses such as copying or moving). At the same time, the Cinavia screening client on the sink device starts to perform NHU (No Home Use) screening by attempting to extract NHU watermark and enforcing the content use policy if a NHU is detected.

Once the sink device receives a content credential from the source device, it continues NHU screening, and additionally performs TS screening or SA screening in accordance with content credential.

For legacy source device with Common DTCP Device Certificate to be SA compliant, it must be updated with a DTCP Device Certificate with a unique Device ID and associated Cinavia signed message.

If the content credential contains pre-existing watermark extraction record of the received content, the sink device performs verification of the watermark extraction record and enforcement in accordance with the extraction record without performing watermark extraction from the received content.

Source Authentication Flag in DTCP Source Device Certificate

This source authentication method requires an extension of DTCP device certificate or an extension of both DTCP and HDCP certificate by defining a Source Authentication (SA) flag in the HDCP or DTCP device certificate to indicate that the HDCP or DTCP link protection is only enabled by the source device for SACT content. The source device with the device certificate containing the SA flag that is set to true should not enable the link protection for non-SACT content.

The source and sink devices support both HDCP and DTCP, and SA flag in DTCP device certificate but not in HDCP device certificate If the source and sink device are connected via HDMI (or DisplayPort or DVI) and HDCP is used for link protection, the source device first verifies the SA flag value in the DTCP device certificate. If the flag value is true and the content is protected by a SACT technology, then the source device enables the HDCP link protection for content transmission. Otherwise, the HDCP is not enabled. Then the source sink device initiatives the DTCP authentication and key exchange process. If the authentication is successful, the DTCP source device certificate is validated. Otherwise, source authentication fails and the sink device does not trust the DTCP source device certificate with the SA flag and then performs content screening.

If the source and sink device are connected via network and DTCP is used for link protection, the source device first verifies the SA flag value in the DTCP device certificate. If the flag value is true and the content is protected by a SACT technology, then the source device enables the DTCP link protection for content transmission. Otherwise, the HDCP is not enabled.

The source and sink devices support both HDCP and DTCP, and SA flag in both DTCP and HDCP device certificate If the source and sink device are connected via HDMI (or DisplayPort or DVI) and HDCP is used for link protection, the source device first verifies the SA flag value in the DTCP device certificate. If the flag value is true and the content is protected by a SACT technology, then the source device enables the HDCP link protection for content transmission. Otherwise, the HDCP is not enabled.

If the source and sink device are connected via network and DTCP is used for link protection, the source device first verifies the SA flag value in the DTCP device certificate. If the flag value is true and the content is protected by a SACT technology, then the source device enables the DTCP link protection for content transmission. Otherwise, the HDCP is not enabled.

Cinavia Public Key Device Certificate for Source Authentication

This SA method requires that a unique public key device certificate ("Cinavia device certificate") signed and issued by Cinavia CA (Certificate Authority) for each source device.

Cinavia device certificate can be an X509 public key certificate or in a proprietary format (e.g., in a format similar to DTCP device certificate).

Once HDCP or DTCP link protection is established, the source device:
  Creates an encrypted content credential by encrypting the content credential using a shared key established during DTCP/HDCP authentication process;
  Sends its Cinavia device certificate and encrypted content credential to the sink source for source authentication.

Once the sink device receives the Cinavia device certificate and encrypted content credential, it:
  Verifies the Cinavia device certificate using Cinavia CA's public key;
  Decrypts the encrypted content credential.

When certain information in content credential changes on the source device, the sink device sends encrypted content credential to the sink device as described above.

Cinavia CA as a DTCP Device CA designated by Digital Transmission Licensing Administrator (DTLA) for source authentication.

DTCP2 (See http://www.dtcp.com) supports 2-level PKI certification authority hierarchies. DLTA can delegate the right to a DTCP Device CAs (a subordinate CA of DLTA) to issue DTCP Device Certificates. See www.dtcp.com for details regarding DTLA. The general benefits of 2-level CA include flexibility and distributed load to issue device certificates, and reduced risk and cost for failed or compromised CA.

The following rule is required to be defined by DLTA for the DTCP Device Certificates issued by Cinavia Device CA:
  Source authentication is successful if the issuer of the DTCP device certificate is the Cinavia Device CA and the certificate is validated using the Cinavia Device CA's public key.

Message Exchange in Source Authentication

Display Data Channel (DDC) Channel Via HDMI

If the source and sink devices are connected via HDMI, an E-EDID (Enhanced Extended Display Identification Data) extension over Display Data Channel (DDC) can be used for communication in source authentication.

One segment between the E-EDID segment 1 and the E-EDID segment 255 can be used for the source device to send the authentication information (including DTCP source device certificate and associated Cinavia signed message, Cinavia public key device certificate, and content credentials) to the sink device for source authentication.

Digital Watermarks

Source authentication requires only one-way communication from the source device to sink device. The source device can use digital audio and/or video watermarks to transmit the information to the sink device for source authentication.

Once the DTCP or HDCP authentication is completed or when certain information in content credential changes on the source device, the source device first encrypts the information for source authentication using a cryptographic key established during the authentication (either the Content Key or the sink device's public key). The source device then embeds the encrypted information in the audio and/or video content being transmitted from the source device to the sink device.

On the sink device, it continuously monitors if watermarks are present. If presence of the watermarks is detected, the sink device extracts the encrypted information carried in the watermarks and decrypts the encrypted information using the key to obtain the information used for the source authentication.

An exemplary watermarking system that can be used for carrying the source authentication information is ATSC 3.0 video watermark as defined in ATSC 3.0 Standard: Content Recovery in Redistribution Scenarios, A/336, which is incorporated herein by reference. For example, a User Private Message defined in this ATSC 3.0 A/336 standard can be used to convey the authentication information in video watermarks.

Device Certificate Revocation

Both HDCP and DTCP CAs can revoke the device certificates using SRMs as described in https://www.dtcp-.com and https://www.digital-cp.com, respectively.

In addition, Cinavia CA can create its own SRMs for revocation of device certificates (either DTCP source device certificates or Cinavia source device certificate). The SRMs are signed by Cinavia CA using Cinavia CA's private key.

Alternatively, Cinavia CA can designate the revocation to another entity (e.g., using cross certification). For example, the SRMs can be signed using a digital certificate signed by an ATSC 3.0 CA that is chained to an ATSC 3.0 Root CA, and then signed again by the Cinavia CA. SRMs can be distributed as an ATSC 1.0 or ATSC 3.0 signaling file. (see ATSC 1.0 A/98 "System Renewability Message Transport" at www.atsc.org), which is hereby incorporated by reference.

The sink device is required to manage and process SRMs during source authentication. If the source device ID (in DTCP device certificate or in the Cinavia public device certificate) is present in a valid SRM, the source authentication fails.

SRMs may be delivered to either source or sink devices. When the SRMs are delivered to the source device, it should transmit the SRMs to the sink device during or prior to source authentication.

Whitelist and Blacklist of Content Sources and SACT Update

If content source of the received content is available in content credential, the sink device compares the content source with a whitelist and/or a blacklist of content sources. If it matches with one of the content sources in the whitelist, SA content screening is not performed. On the other hand, if it matches with one of the content sources in the blacklist, SA content screening is performed.

Both whitelist and blacklist are signed by Cinavia CA (or its designated CA) and delivered to the sink device in the way that SRMs are signed and distributed as described in section 0. In fact, both SRMs and white/black lists can be signed and delivered together as a single data object.

A list of SACT technologies can be updated in the same way as the whitelist or blacklist described above.

Figure 3:
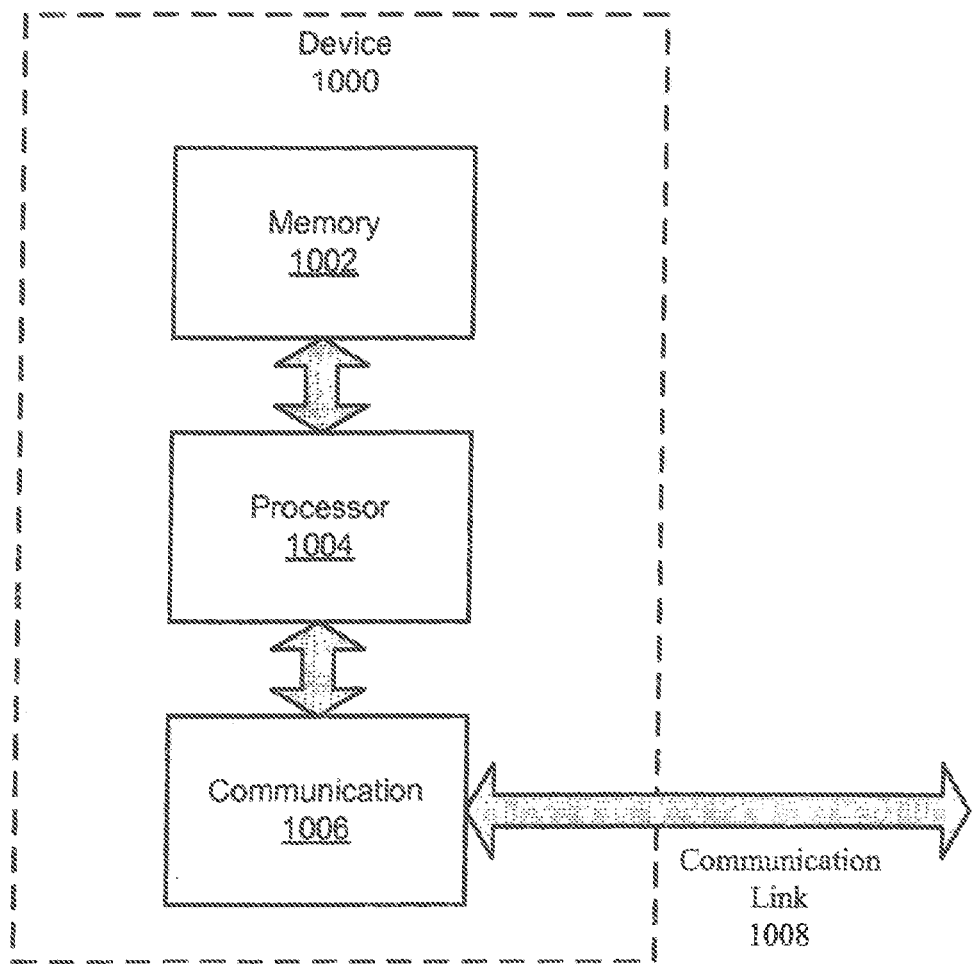
FIG. 3 illustrates a block diagram of a device that can be used for implementing various disclosed embodiments.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 3 illustrates a block diagram of a device 1000 within which the various disclosed embodiments may be implemented. The device 1000 comprises at least one processor 1002 and/or controller, at least one memory 1004 unit that is in communication with the processor 1002, and at least one communication unit 1006 that enables the exchange of data and information, directly or indirectly, through the communication link 1008 with other entities, devices and networks. The communication unit 1006 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Referring back to FIG. 3 the device 1000 and the like may be implemented in software, hardware, firmware, or combinations thereof. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method comprising:
   receiving content from a source at a sink device;
   determining, using the sink device, the content protection status of the content;
   defining a reserved bit in a copy protection audio track watermark payload to be a Source Authentication bit, wherein source authentication is required for playback over link protection;
   establishing a list of content protection systems that are source authentication compliant technologies;
   embedding in content by a broadcaster a watermark having a payload that includes the Source Authentication bit; and
   distributing the embedded content by a broadcaster in a distribution system that comprises at least one of: SACT, TS/NoSA in TSMAT distribution, NIR, or unwatermarked otherwise.

2. The method according to claim 1 wherein the receiving is over a link protected interface.

3. The method according to claim 1 wherein the determining is according to a Source Authentication protocol.

4. The method according to claim 1 wherein SACT requires that the system is TSMAT and requires Source Authentication protocol on all link protection inputs and outputs.

5. The method according to claim 1 wherein HDCP and DTCP without SA shall be TSMAT but not SACT.

6. The method according to claim 1 wherein the distributing by a broadcaster is according to a SACT content protection system for ATSC 3.0 encrypted broadcasts with compliance rules for TV/Media Receivers (STB/DMA) including one or more of: Screen HDMI sources with HDCP SA, Screen USB sources with DRM SA, screen application sources with DRM SA, Screen Miracast or other casting sources with DTCP SA, screen DLNA or other home network sources with DTCP SA, employ SA on any link protected outputs, and referred sale.

* * * * *